United States Patent [19]

Uhlig et al.

[11] 4,140,236

[45] Feb. 20, 1979

[54] METHOD FOR BLOW MOLDING HOLLOW ARTICLE WITH INTEGRALLY BONDED ATTACHMENT, AND ARTICLE

[75] Inventors: Albert R. Uhlig; Andrew J. Stoll, III, both of Toledo, Ohio

[73] Assignee: Owens-Illinois, Inc., Toledo, Ohio

[21] Appl. No.: 821,690

[22] Filed: Aug. 4, 1977

[51] Int. Cl.² .................. B65D 7/42; B29C 17/06
[52] U.S. Cl. ........................ 220/71; 220/69; 428/35; 264/501; 264/510
[58] Field of Search .............. 220/71, 72, 70, 69; 264/96, 98; 428/35

[56] References Cited

U.S. PATENT DOCUMENTS

| | | | |
|---|---|---|---|
| 3,275,726 | 9/1966 | Rudolph | 220/71 |
| 3,647,110 | 3/1972 | Hammes | 220/72 |
| 3,838,789 | 10/1974 | Cvacho | 220/69 |
| 3,889,839 | 6/1975 | Simon et al. | 220/72 |
| 3,960,474 | 6/1976 | Kader | 425/525 |
| 4,022,345 | 5/1977 | Butz | 220/71 |

Primary Examiner—William R. Dixon, Jr.
Attorney, Agent, or Firm—Charles S. Lynch; M. E. Click; D. H. Wilson

[57] ABSTRACT

Disclosed is a method for making a hollow plastic article having a separate full ring-shaped member bonded to the article within the blow mold, and the article so made.

2 Claims, 17 Drawing Figures

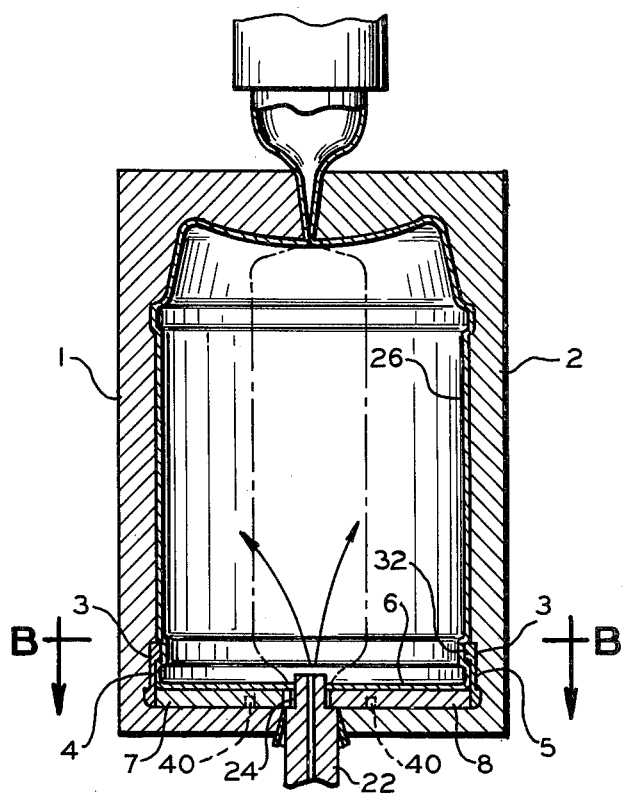
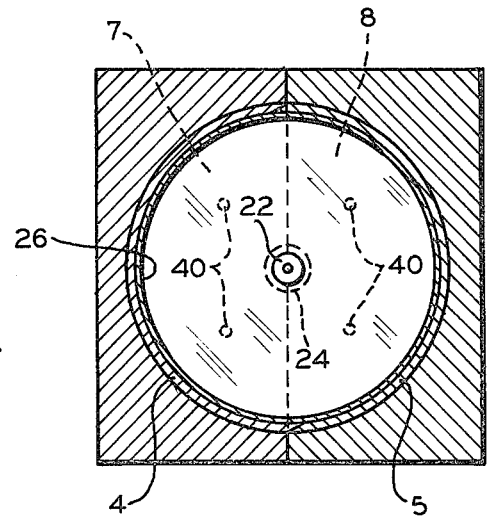
FIG. 3
FIG. 4
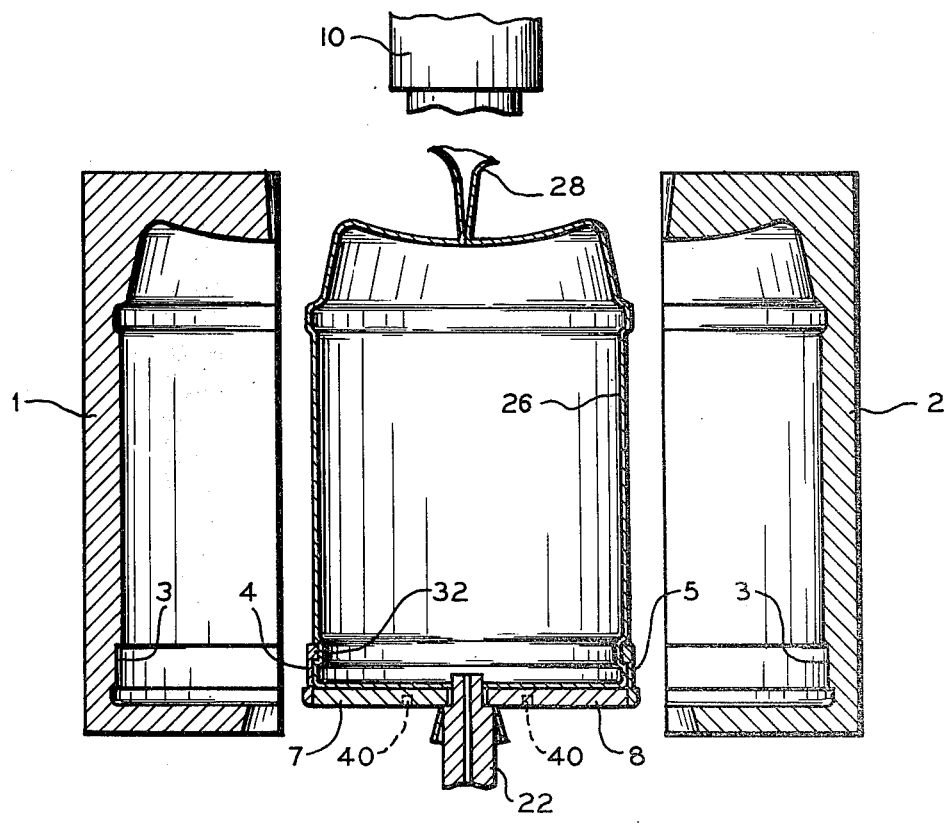
FIG. 5

METHOD FOR BLOW MOLDING HOLLOW ARTICLE WITH INTEGRALLY BONDED ATTACHMENT, AND ARTICLE

This invention is in one aspect an improved process for forming a blow molded hollow article having a full ring-shaped member bonded to a periphery thereof.

In U.S. Pat. No. 3,960,474 to Kader there is disclosed a method of molding hoops around the end of a drum, during blow molding thereof, where the hoops extend axially beyond the drum end. The method involves (a) placing a hoop in one-half of the blow mold in a peripheral groove in the inner wall thereof, so that a semi-circle of the hoop protrudes horizontally from the mold half, (b) moving the mold to a partially closed position until the semi-circle of the hoop underlies an extruded parison, (c) advancing the parison through the hoop and between the mold halves, (d) closing the semi-cylindrical mold halves, (e) closing semi-circular end plates of the mold halves by moving the plates toward said hoops and engaging same, (f) blowing the parison to form the drum and cooling the drum, (g) moving said end plates axially away from the drum, and (h) opening the mold halves and removing the molded drum.

It is an object of the present invention to provide an improved method for molding hollow articles having integrally molded exterior peripheral annular members.

It is another object to overcome many disadvantages of the above-described process of U.S. Pat. No. 3,960,474, which disadvantages will be pointed out hereafter.

Other objects, features and aspects, as well as advantages, of the present invention will become apparent from a study of the following description and drawings.

According to one aspect of the present invention there is provided an improvement in a method for molding into the outer wall of a hollow plastic article a member positioned to surround the periphery of said article, which member has a full ring shape in cross section, said method comprising inserting such ring-shaped member between the facing halves of a blow mold, inserting a hollow parison of soft thermoplastic material between said mold halves, closing said mold halves around said parison and blowing said parison to form a final hollow article having said ring-shaped member peripherally bonded thereto, which improvement comprises (1) inserting into the halves of the blow mold, separate halves of the ring-shaped member, which halves are adapted to engage each other to form a full ring and (2) forming said full ring during the step of closing said blow mold halves, during which closing the ends of the halves of said ring-shaped member become lockingly engaged to form said full ring.

In another aspect of the invention there is provided a further improvement of the foregoing improved process, wherein said ring-shaped member is positioned in an end of said blow mold so that it projects a greater axial distance than at least a portion of an end of the hollow article to be formed, which further improvement comprises inserting in the end of each blow mold half, before closing same, a solid mold filler insert, which is at least as deep axially as the height that said ring-shaped member projects beyond the end of said article to be formed, so as collectively to occupy the space between the projected end wall of said hollow article to be formed and said end of said blow mold, thereby obviating the need to employ a blow mold having axially movable end plates, opening said blow mold and removing said hollow article and said inserts from said blow mold, and thereafter removing said inserts from the end of said hollow article.

In accordance with a further aspect of the invention there is provided an improvement in a method for molding a hollow plastic article having a circumferential sidewall terminating at one end in a closed end and concomitantly integrally molding into said sidewall a member positioned (1) to surround the periphery of said article and (2) to project a greater axial distance than at least a portion of said end to be formed, which member has a full ring shape in cross-section, said method comprising inserting such ring-shaped member between the facing halves of a blow mold, inserting a hollow parison of soft thermoplastic material between said mold halves, closing said mold halves around said parison and blowing said parison into a final hollow article having said ring-shaped member peripherally bonded thereto, the improvement which comprises (1) inserting into the halves of the blow mold, separate halves of the ring-shaped member, which halves are adapted to contact each other to form a full ring and (2) inserting in the end of each blow mold half a solid mold filler insert, which is at least as deep axially as the height that said ring-shaped member extends beyond said end of said article to be formed, and (3) forming said full ring during the subsequent step of closing said blow mold halves, during which closing the ends of the halves of said ring-shaped member meet to form said full ring, said solid mold filler inserts collectively occupying the space between the projected end wall of said hollow article to be formed and said end of said blow mold, thereby obviating the need to employ a blow mold having axially movable end plates, (4) opening said blow mold and removing said hollow article with said inserts from said blow mold, and (5) thereafter removing said inserts from the end of said hollow article.

In U.S. Pat. No. 3,275,726 there is disclosed in connection with FIG. 15, the insertion of reinforcing hoops 70,71, which are bipartite, in a mold, closing the mold and then blowing the article. However, no means for lockingly engaging the halves of the hoops during mold closing is disclosed.

The present invention is described with respect to specific embodiments in connection with the following drawings.

FIG. 3 shows the apparatus used in the invention after the mold halves have closed and the parison has been blown.

FIG. 4 is a top view of section B—B of FIG. 3.

FIG. 5 illustrates the opening of the mold halves after the blowing operation.

FIG. 6 also depicts the stacking capability of the finished drums.

FIG. 8 shows the ends of two ring halves while

Figure 1:
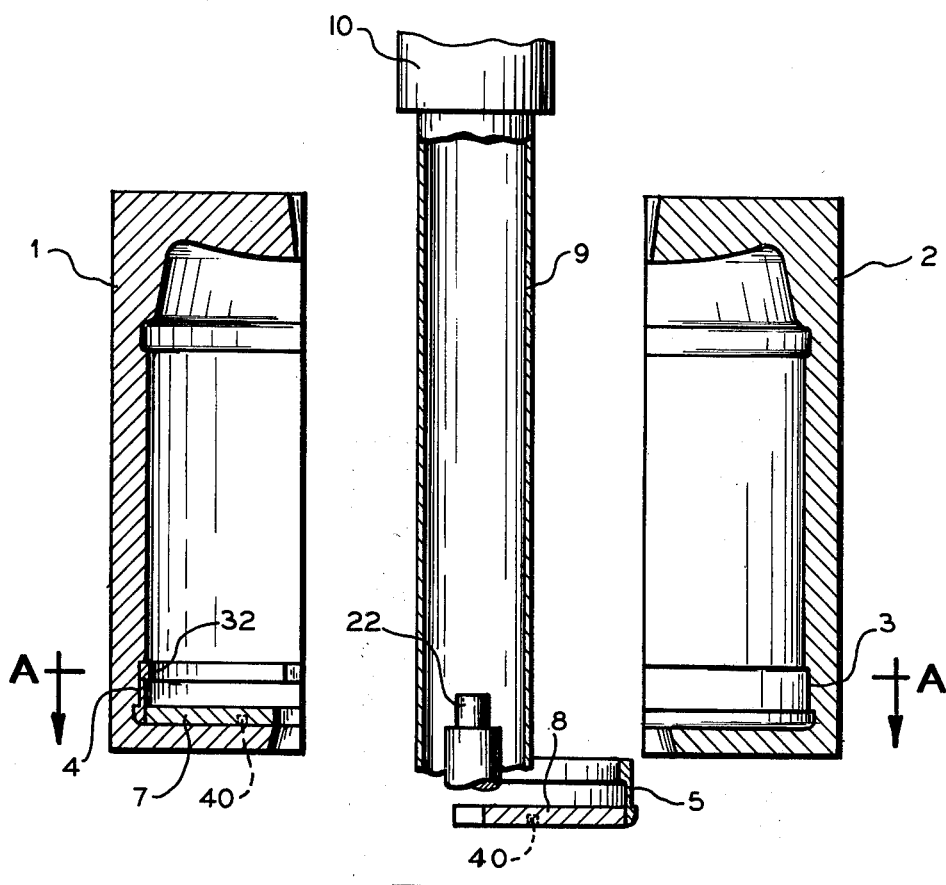
FIG. 1 is a cross-sectional view showing blow molding apparatus used in the invention preparatory to closing around extruded tubing to be blown.
Figure 2:
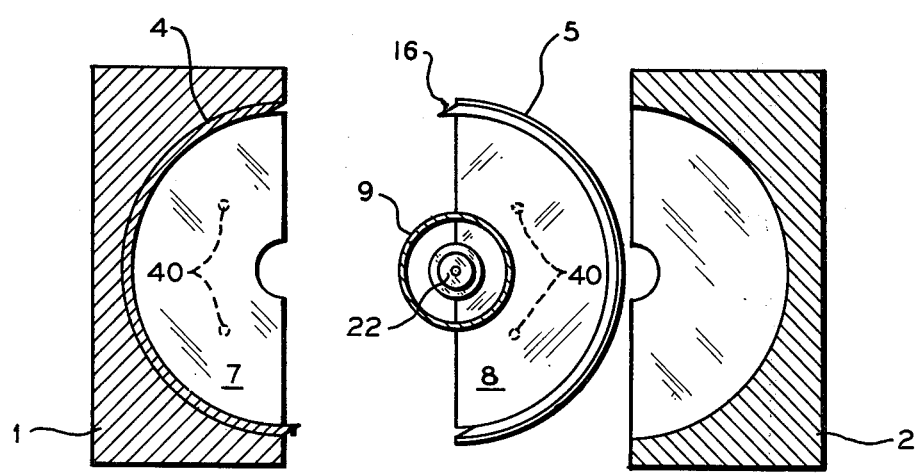
FIG. 2 is a top view of section A—A of FIG. 1.

Referring now to the drawings, the blow mold apparatus comprises a generally cylindrical mold divided into generally semi-cylindrical halves 1 and 2. Each of the mold halves has a complex semi-circular groove 3 in the bottom end sidewall. When the two mold halves 1 and 2 are moved into engagement with one another (as shown in FIGS. 3 and 4), the grooves 3, 3 align with one another to form an annular lower groove. These annular grooves receive and retain the most peripheral semi-circular portions of the semi-circular ring-shaped members 4 and 5.

Since, as shown in FIG. 3, the ring-shaped member 4,5 extends axially past the lowest portion of the hollow article or container 26 (the drum or container 26 is in inverted position in FIG. 3), generally semi-circular removable mold inserts are used so that the mold can be opened after ring-shaped member becomes integrally bonded with the container wall.

In operation, a soft thermoplastic tubular parison 9 is emitted from the outlet head 10 of an extruder, not shown. Facing mold halves 1,2 are positioned on opposite sides of parison 9. Instead of an extruded tube, parison 9 can be a generally tubular injection molded parison with the top end closed and the bottom end open. Semi-circular ring-shaped members 4 and 5 are placed in position in grooves 3,3. 4 is shown in place and 5 ready to be inserted. Also, removeable mold inserts 7,8 are placed in the bottom of the mold cavity.

Figure 6:
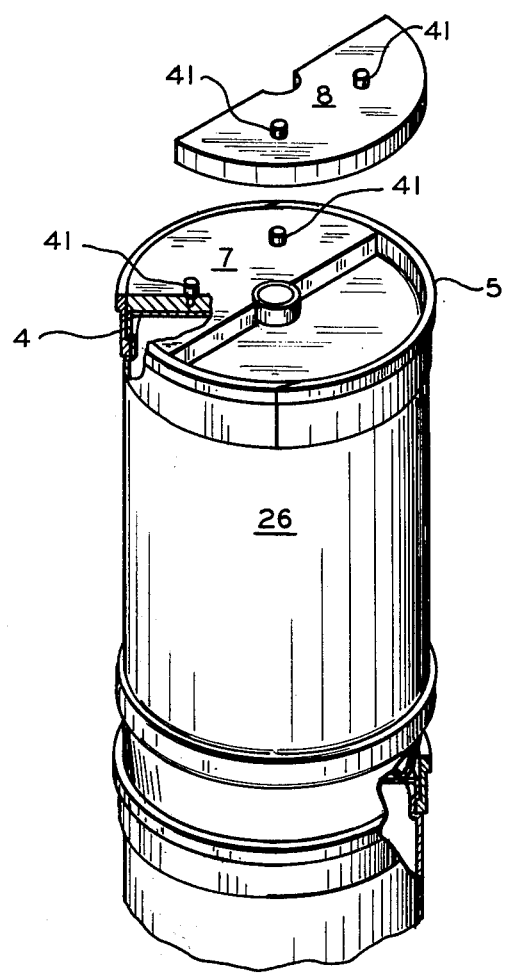
FIG. 6 shows the finished drum with molded in rim and illustrates removal of filler inserts shown in FIGS. 1–5.
Figure 7:
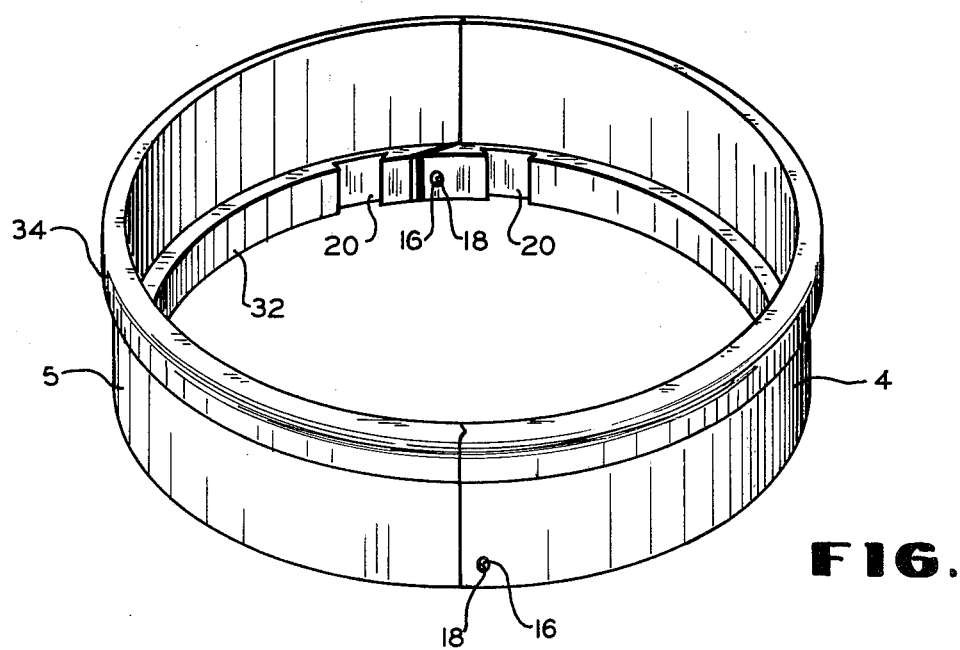
FIG. 7 is an enlarged perspective view of the halves of a full ring, snapped together as in FIGS. 3–6.
Figure 8:
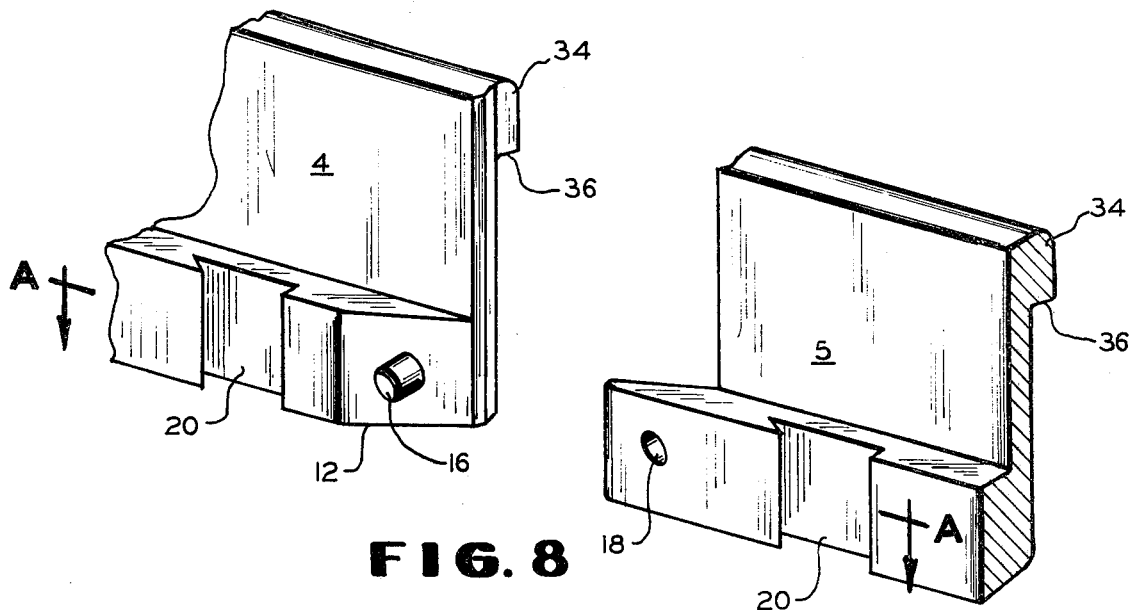
Figure 8:
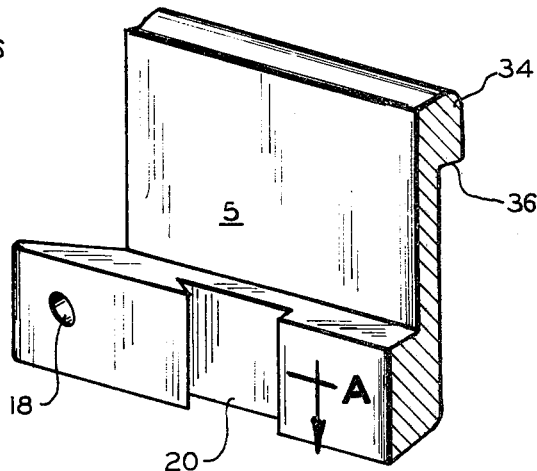
Figure 12:
FIG. 12 is a cross-sectional view taken along A—A of FIG. 11.

In FIG. 7 rings 4 and 5 are shown joined and locked to form a full ring as in FIGS. 3, 4, 5 and 6. FIG. 8 illustrates in enlarged detail one end of 4 which meets an end of 5. When these ends are pressed together in the direction of the arrows, bevelled end extension 12 slides against bevelled end extension 14 and pin 16 snaps into hole 18. At the same time the other ends of the rings are similarly snapped together and the semi-rings are lockingly engaged to form a full ring. FIG. 12 shows a V in the end of 5 which meets a V-shaped notch in the abutting end of 4. This fit is to prevent outward bending of the top of the ring shape when radial forces are applied to the top of the ring-shaped member. Similarly, while the locking engagement involving bevelled ends 12 and 14, pin 16 and hole 18 is advantageous, the ends of 4 and 5 can be designed to merely abut a similar V-shaped engagement to ensure proper alignment.

Figure 9:
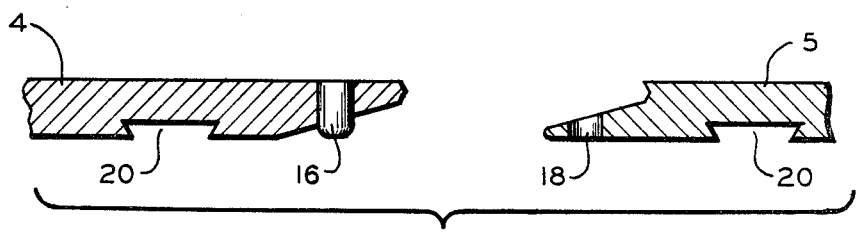
FIG. 9 shows section A—A of FIG. 8.
Figure 10:
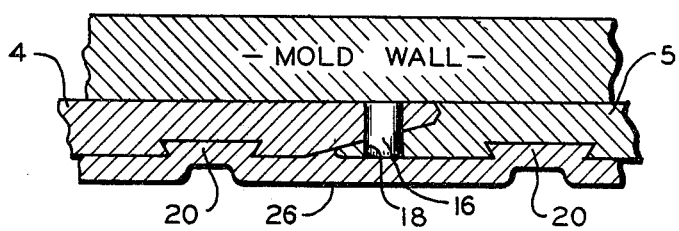
FIG. 10 shows the ends shown in FIG. 9 snapped together within the mold, with the container wall molded into the locking grooves 20. It is a partial cross-sectional view taken along line B—B of FIG. 3.

In FIGS. 8, 9 and 10 are shown "tongue and groove" type grooves 20 which are advantageously placed near each end of 4 and 5, and similar grooves can optionally also be spaced around the inner periphery of 4 and 5.

Pneumatic nozzle 22 in FIG. 1 is aligned with extruder head 10 so that it will receive the lower end of soft thermoplastic tube 9.

After 4, 5, 7 and 8 are in position as shown for 4 and 7 in FIG. 1, mold halves 1,2 are closed around tubular parison 9; this action pinches the ends of parison 9 closed and forms the container opening 24 around nozzle 22. Of course, if the parison is injection molded, the closed end is completely within the mold and is therefore not pinched. If 24 is to have internal threads, an externally threaded bushing, not shown, is loosely fitted around nozzle 22 in the usual manner and threads are formed in the plastic by compression. Then when the container has been formed and removed from the mold, the bushing can be unscrewed from the threaded opening.

The dotted lines in FIG. 3 represent parison 9 just before blowing gas such as air is admitted through nozzle 22 to blow parison into conformance with the walls of the blow mold, ring 4,5 and inserts 7,8, thus forming container 26.

During closing of the mold halves the half rings 4,5 become lockingly engaged in the manner described with respect to the description of FIG. 8.

After the container 26 is formed the mold halves 1,2 are moved horizontally apart as illustrated in FIG. 5 and the container with integrally bonded ring member 4,5 is removed from the mold. Of course, the tail of tube 9 has already been severed from the plastic tube issuing from head 10, and after removal from the mold, the flash or tail 28 is cut from the container bottom.

Figure 11:
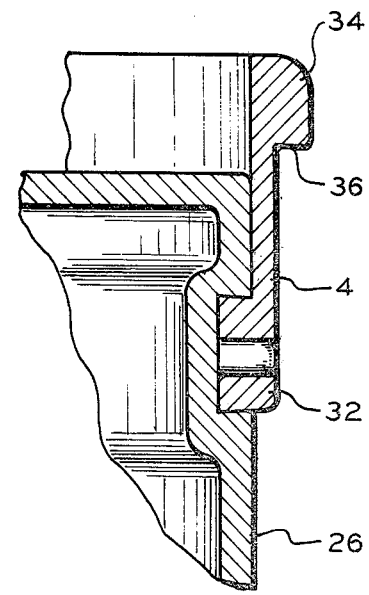
FIG. 11 is a partial cross-sectional view of the top of the drum-rim combination of FIG. 6 taken in a plane cutting through one of the pins depicted in FIG. 8.

During the blow molding process described, plastic of the container wall being formed is forced into grooves 20 so that the ring-shaped member 4,5 is locked against circumferential movement relative to the wall of the container 30. Reference to FIGS. 1,3 and especially FIGS. 7 and 11 show the diverging shape of the upper and lower walls of annular inwardly radially extending flange 32 of ring-shaped member 4,5. Container 26 as formed also makes an interference fit around flange 32, thus resisting radial displacement of ring-shaped member 4,5.

As will be seen in FIG. 11, semi-annular member 4, when joined with semi-annular member 5, is of a generally cylindrical shape with an inwardly radially extending flange 32 at the bottom locked into and bonded with the wall of drum 26 and with an outwardly radially extending thickened portion or flange 34 at the top forming a downwardly facing circumferential annular ledge 36. The shape of the ring-shaped member 34 at the top is such that it can be grasped by steel drum chime-handling devices for lifting or it can be lifted by engagement of the ledge 36 by the arms of a fork lift.

The semi-circular ring-shaped members 4 and 5 can be of any suitable rigid material. For instance, high density, high molecular weight polyethylene thermoplastic can be used and the shape can be formed by a combination of extrusion and of machining of grooves 20 and of the holes or the shape can be made by injection molding without necessity for machining. Or the rings can be formed from a metal such as steel by extrusion followed by machining. Any other suitable hard material can be used for the ring-shaped members. The mold inserts 7 and 8 can be formed from any suitable material. For instance, they can be carved from wood, pressed from wood chips, made from a suitable ceramic or molded from a suitable plastic, either thermosetting or thermoplastic, that is not softened or deleteriously affected by the blow molding temperatures used. In FIGS. 1-5, the holes 40 are threaded holes into which threaded rod-shaped members 41 shown in FIG. 6 are inserted after container 26 is removed from the mold for the purpose of lifting insert members 7,8 from the top of the container.

FIG. 6 shows the finished container with one insert removed and the other still in place. Also shown at the top is a partial cross-sectional view of the finished combination ring and drum. Container 26 is shown stacked on the top of another identical container in a manner made clear by the partial cross-sectional view of the top of the lower container and the bottom of the upper container.

Figure 13:
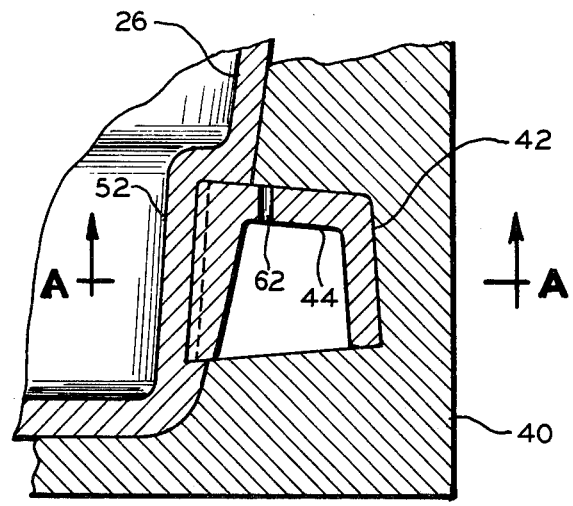
FIGS. 13-17 show an embodiment similar to that of FIGS. 1-12 and will be more fully discussed hereafter.
Figure 14:
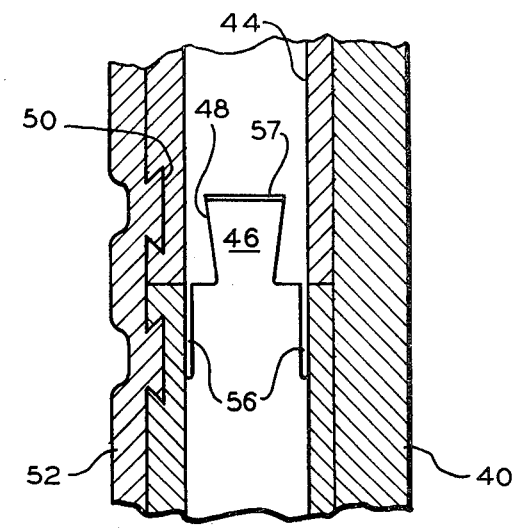
Figure 15:
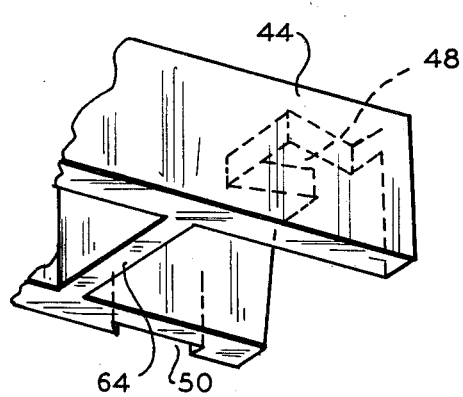
Figure 16:
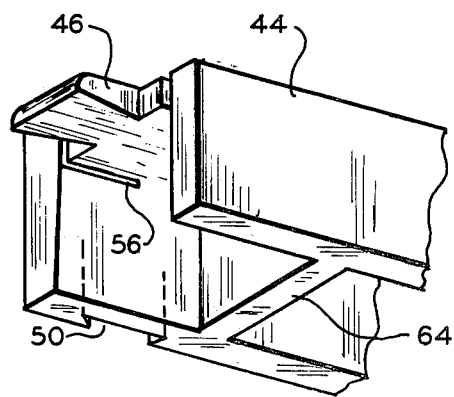
Figure 16:
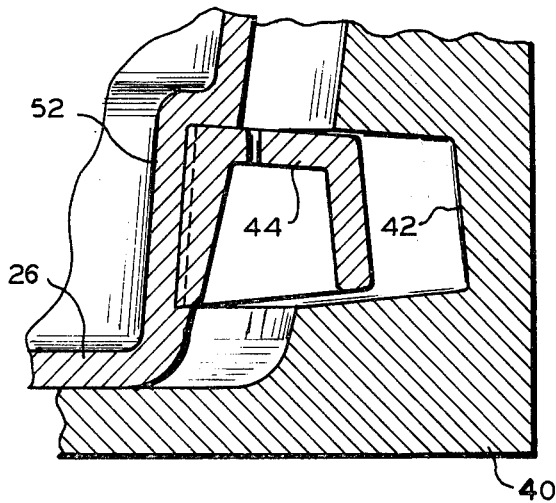
Figure 17:
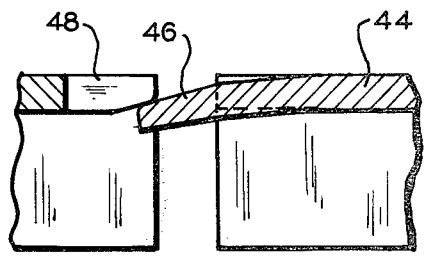

FIGS. 13-17 illustrate a different but similar apparatus and ring-shaped member. FIG. 13 is a partial cross-sectional view showing a bottom portion of blow mold wall 40 with annular groove 42 for receiving semi-circular annular ring-shaped member 44 having a generally U-shape in cross-section. As in the other embodiment, when the blow mold halves close the two U-shaped half-rings engage each other in locking relationship. FIG. 14 is section A—A of FIG. 13 and shows dovetail 46 and groove 48; also depicted in the perspective view of FIG. 15 before the ends meet. FIGS. 14 and 15 also show notches 50 which are similar to notches 20 of the embodiment of FIG. 1 and serve the same purpose. FIG. 17 shows in a side view how the bevelled edges of the joint 46,48 guide 46 home as the mold closes. Slots 56 aid such flexing while these slots as well as slot 57 serve to allow drainage, as do optional drain holes 62 of FIG. 13. FIG. 16 shows the molded container 52 being removed from the blow mold. In FIG. 15 are shown optional but desirable reenforcing ribs 64 bridging the U-shape. These are especially desirable near the two joints but can also be used at other points around the circumference of the ring.

It will be noted that the ring-shaped member of the embodiment of FIGS. 13-17 does not extend to the end of the container, and therefore there is no need for any mold insert members such as 7,8 in the embodiment of FIGS. 1-12.

Referring to the previous description of Kader U.S. Pat. No. 3,960,474, the present process has at least the following advantages:

(1) The tubular parison that can be used in Kader must be less than one-half the diameter of the blow mold. There is no such limitation in the present invention.

(2) The tubular parison in the present process can be moved into position between the mold halves before or while the blow mold halves are closing. In Kader the following suquented steps are necessary: the mold halves must move partly together and stop at the point that the radius of the projecting half of the hoop is centered under the extruder outlet, then the tube must be extruded through the hoop half, then the mold halves must be closed around the parison and pinch it shut, then the end plates must be moved into position, then air is admitted to blow the parison to shape, then end plates must be moved to their extended position, then the mold halves must be opened to remove the molded drum. All of these extra motions greatly increase the cycle time of the blow mold itself, seriously limiting productivity per machine.

(3) The full ring inserts that can be used in Kader are limited in their design; otherwise they will sag and will not meet the grooves in the opposing blow mold half. This fact is brought out by the common assignee in its German patent application No. 7412047 filed July 11, 1974.

(4) The moveable ends make the blow mold of Kader more expensive initially and more expensive to operate since the additional mold motions nearly always cause more frequent break-downs.

As will be evident to those skilled in the art, various modifications of this invention can be made or followed in the light of the foregoing disclosure and discussion without departing from the spirit and scope of the disclosure or from the scope of the claims.

We claim:

1. A hollow plastic article having a circumferential sidewall terminating in a closed top end and having a generally cylindrical member of hard material surrounding the periphery of the article and projecting axially above at least a portion of said top end, said member being out of contact with said top end and having (1) a lower inwardly radially extending flange locked into said sidewall by a mechanical interference fit and (2) an upper outwardly radially extending flange forming a downwardly facing circumferential annular ledge and adapted to be grasped by steel drum chime-handling devices.

2. A hollow plastic article formed by blow molding, having a generally circumferential sidewall and closed ends and intermediate said ends an annular ring of hard material having a generally U shape in cross-section with the open end of the U facing upwardly, the inner leg of the "U" being embedded in an annular groove in said sidewall and being locked in said sidewall by an interference fit created during said blow molding.

* * * * *

Disclaimer 4,140,236.—*Albert R. Uhlig* and *Andrew J. Stoll III*, Toledo, Ohio. METHOD FOR BLOW MOLDING HOLLOW ARTICLE WITH INTEGRALLY BONDED ATTACHMENT, AND ARTICLE. Patent dated Feb. 20, 1979. Disclaimer filed Apr. 13, 1979, by the assignee, *Owens-Illinois, Inc.*

Hereby enters this disclaimer to claim 1 of said patent.

[*Official Gazette June 19, 1979.*]